United States Patent
Yamamoto et al.

(10) Patent No.: US 7,118,501 B2
(45) Date of Patent: Oct. 10, 2006

(54) V-BELT CONTINUOUSLY VARIABLE TRANSMISSION

(75) Inventors: Masahiro Yamamoto, Fuji (JP); Midori Yamaguchi, Fuji (JP)

(73) Assignee: JATCO Ltd, Fuji (JP)

( * ) Notice: Subject to any disclaimer, the term of this patent is extended or adjusted under 35 U.S.C. 154(b) by 257 days.

(21) Appl. No.: 10/650,127

(22) Filed: Aug. 28, 2003

(65) Prior Publication Data
US 2005/0192131 A1  Sep. 1, 2005

(30) Foreign Application Priority Data
Aug. 29, 2002 (JP) .............................. 2002-250462

(51) Int. Cl.
*F16H 61/06* (2006.01)
(52) U.S. Cl. .......................................... 474/18; 474/28
(58) Field of Classification Search ............ 474/17–18, 474/28, 46, 30, 39, 69–70; 477/45–54, 158, 477/159, 161; 701/54
See application file for complete search history.

(56) References Cited

U.S. PATENT DOCUMENTS

| | | | | |
|---|---|---|---|---|
| 5,168,778 A | * | 12/1992 | Todd et al. | 477/49 |
| 5,269,726 A | * | 12/1993 | Swanson et al. | 474/28 |
| 6,007,452 A | * | 12/1999 | Sawada et al. | 477/45 |
| 6,110,062 A | * | 8/2000 | Fujikawa | 474/28 |
| 6,454,675 B1 | * | 9/2002 | Asayama et al. | 701/54 |
| 6,464,603 B1 | * | 10/2002 | Reuschel et al. | 474/28 |

FOREIGN PATENT DOCUMENTS

| | | | |
|---|---|---|---|
| JP | 3-181659 A | | 8/1991 |
| JP | 2001-21016 A | * | 1/2001 |

* cited by examiner

*Primary Examiner*—Marcus Charles
(74) *Attorney, Agent, or Firm*—Foley & Lardner LLP

(57) ABSTRACT

A V-belt continuously variable transmission includes a primary pulley and a secondary pulley. The primary pulley is connected to an input shaft and the secondary pulley is connected to an output shaft. A V-belt is wrapped around the primary and secondary pulleys. When a speed ratio is to be increased: (a) the oil pressure supplied to the primary pulley is set to an oil pressure necessary for ensuring a torque capacity of the V-belt and for maintaining the speed ratio; and (b) the oil pressure supplied to the secondary pulley is set to an oil pressure that is higher than the oil pressure necessary for ensuring the torque capacity of the V-belt and for maintaining the speed ratio, thereby attaining a target speed change speed.

2 Claims, 10 Drawing Sheets

V-BELT CONTINUOUSLY VARIABLE TRANSMISSION

BACKGROUND OF THE INVENTION

1. Field of the Invention

The present invention relates to a V-belt continuously variable transmission used in an automobile or the like.

2. Description of the Related Art

JP 3-181659A, published by the Japan Patent Office in 1991, discloses a V-belt continuously variable transmission (V-belt CVT). The V-belt CVT is provided with a primary pulley into which engine rotation is input, a secondary pulley that outputs rotation to drive wheels, and a V-belt that transmits the primary pulley rotation to the secondary pulley. A ratio of an input rotation speed to an output rotation speed (speed ratio) is regulated by adjusting a ratio of a contact radius between a pulley and a V-belt in the primary pulley to that in the secondary pulley (pulley ratio).

When maintaining the pulley ratio in JP3-181659A, an oil pressure (primary pressure) supplied to the primary pulley is controlled based on an input torque and the pulley ratio so as to be an oil pressure necessary for maintaining the pulley ratio. When changing the pulley ratio, a correction amount for the primary pressure necessary for achieving a target speed change speed is computed. The primary pressure is increased or decreased based on the correction amount, thereby achieving the target speed change speed.

However, the primary pressure is reduced during a downshift in JP3-181659A, and therefore there is a possibility that a torque capacity of the primary pulley in the V-belt is excessively reduced to cause the V-belt to slip.

An object of the present invention is therefore to provide a V-belt continuously variable transmission in which there is no belt slippage during a downshift.

SUMMARY

According to the present invention, there is provided a V-belt continuously variable transmission including: an input shaft; an output shaft; a primary pulley that is connected to the input shaft and whose groove width changes in accordance with a supplied oil pressure; a secondary pulley that is connected to the output shaft and whose groove width changes in accordance with a supplied oil pressure; a V-belt that is wrapped around the primary pulley and the secondary pulley; and a controller. When a speed ratio of the transmission is to be increased, the oil pressure supplied to the primary pulley is set to an oil pressure necessary for ensuring a torque capacity of the V-belt and necessary for maintaining the speed ratio, and the oil pressure supplied to the secondary pulley is set to an oil pressure that is higher than the oil pressure necessary for ensuring the torque capacity of the V-belt and necessary for maintaining the speed ratio, thereby attaining a target speed change speed.

According to the present invention, when increasing the speed ratio, the oil pressure for the primary pulley is not reduced during the downshift and therefore the V-belt slippage due to the excessive reduction in the torque capacity on the primary pulley can be prevented.

Preferred embodiments and advantages of the present invention will be described in detail below with reference to the following drawings.

BRIEF DESCRIPTION OF THE DRAWINGS

FIGS. 5A and 5B are maps that show relationships between a pulley ratio and a pulley maintenance thrust force, in which FIG. 5A is a map for primary pulley use, and FIG. 5B is a map for secondary pulley use.

FIGS. 9A and 9B are maps that show relationships between a pulley stroke speed and a thrust force correction amount, in which FIG. 9A is a map for primary pulley use, and FIG. 9B is a map for secondary pulley use.

DETAILED DESCRIPTION OF THE PREFERRED EMBODIMENTS

Figure 1:
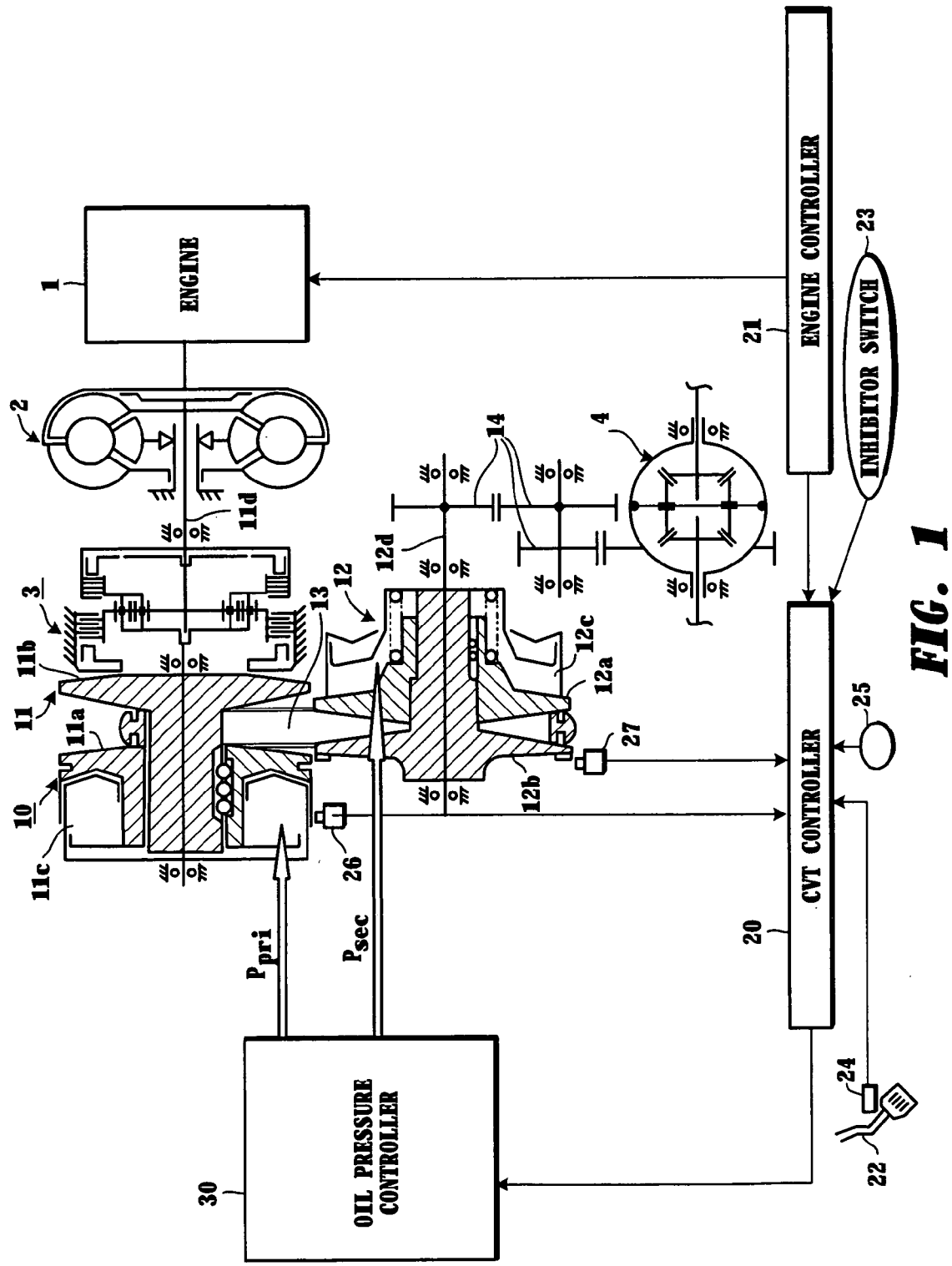
FIG. 1 is a schematic structural diagram that shows a V-belt continuous variable transmission (V-belt CVT) in accordance with the present invention.

Referring to FIG. 1, a V-belt continuous variable transmission (V-belt CVT) 10 includes a primary pulley 11, a secondary pulley 12, a V-belt 13, a CVT controller 20, and an oil pressure controller 30.

The primary pulley 11 is an input shaft side pulley for inputting rotation of an engine 1 to the V-belt CVT 10. The primary pulley 11 includes a fixed conical plate 11b that integrally rotates with an input shaft 11d, and a movable conical plate 11a that is disposed opposing the fixed conical plate 11b, thereby forming a V-shape pulley grove. The movable conical plate 11a displaces in an axial direction due to an oil pressure (primary pressure Ppri) acting on a cylinder chamber 11c. The primary pulley 11 is coupled to the engine 1 through a torque converter 2 having a forward-reverse changeover mechanism 3 and a lock-up clutch. Rotation of the engine 1 is thus input to the primary pulley 11. The rotational speed of the primary pulley 11 is detected by a rotational speed sensor 26.

The V-belt 13 is wrapped around the primary pulley 11 and the secondary pulley 12, and rotation of the primary pulley 11 is transmitted to the secondary pulley 12.

The secondary pulley 12 outputs the rotation transmitted by the V-belt 13 to a differential gear 4. The secondary pulley 12 includes a fixed conical plate 12b that integrally rotates with an output shaft 12d, and a movable conical plate 12a that is disposed opposing the fixed conical plate 12b, thereby forming a V-shape pulley grove. The movable conical plate 12a displaces in an axial direction due to an oil pressure (secondary pressure Psec) acting on a cylinder chamber 12c. A pressure receiving surface area A2 of the cylinder chamber 12c is set to be approximately equal to a pressure receiving surface area A1 of the cylinder chamber 11c of the primary pulley 11.

The secondary pulley 12 is coupled to the differential gear 4 through an idler gear 14 and an idler shaft, and outputs rotation to the differential gear 4. The rotational speed of the secondary pulley 12 is detected by a rotational speed sensor 27. Vehicle speed can be computed from the rotational speed of the secondary pulley 12.

The CVT controller 20 determines a pulley ratio (a value obtained by dividing the contact radius between the secondary pulley 12 and the V-belt 13 by the contact radius between the primary pulley 11 and the V-belt 13, which is synonymous with a speed ratio) and a contact frictional force based on signals from an inhibitor switch 23, an accelerator pedal depression amount sensor 24 for an acceleration pedal 22, an oil temperature sensor 25, the rotational speed sensors 26 and 27, and the like, and a torque signal from an engine controller 21. The CVT controller 20 sends commands to the oil pressure controller 30, and controls the V-belt CVT 10.

The oil pressure controller 30 supplies an oil pressure to the primary pulley 11 and the secondary pulley 12 based on commands from the CVT controller 20, making the movable conical plate 11a and the movable conical plate 12a move in the axial direction.

The pulley groove width changes when the movable conical plate 11a and the movable conical plate 12a move, and the contact radii between the V-belt 13 and the primary pulley 11 and between the V-belt 13 and the secondary pulley 12 thus change. The pulley ratio and the contact frictional forces with the V-belt 13 are thus controlled.

The rotation of the engine 1 is input to the V-belt CVT 10 via the torque converter 2 and the forward-reverse changeover mechanism 3, and is transmitted to the differential gear 4 via the primary pulley 11, the V-belt 13, and the secondary pulley 12.

The movable conical plate 11a of the primary pulley 11 and the movable conical plate 12a of the secondary pulley 12 are displaced in the axial direction, if the accelerator pedal 22 is depressed or there is a shift change command in a manual mode. The contact radii with the V-belt 13 are changed, and therefore the pulley ratio is changed in a continuous manner.

Figure 2:
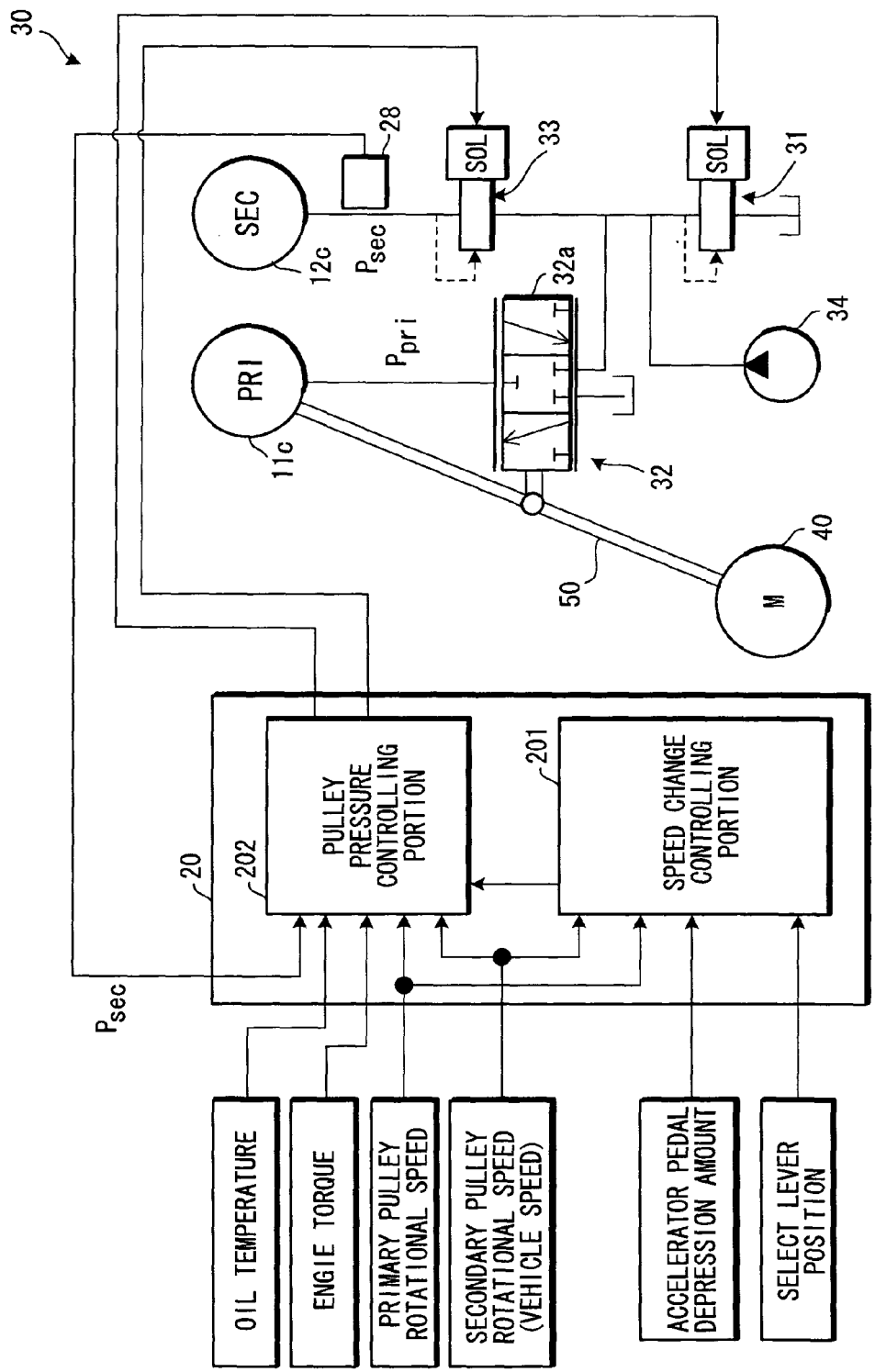
FIG. 2 is a block diagram of an oil pressure controller and a CVT controller of the V-belt CVT.

FIG. 2 is a block diagram of the oil pressure controller 30 and the CVT controller 20 of the V-belt CVT 10.

The oil pressure controller 30 includes a regulator valve 31, a speed change control valve 32, and a pressure reducing valve 33. An oil pressure supplied from the oil pressure pump 34 is adjusted and supplied to the primary pulley 11 and the secondary pulley 12.

The regulator valve 31 has a solenoid, and is a valve that regulates the pressure of pressurized oil from the oil pressure pump 34 to a line pressure PL in response to a command from the CVT controller 20 (for example, a duty signal).

The speed change control valve 32 is a valve that controls the primary pressure Ppri so as to become a target primary pressure tPpri to be discussed later. The speed change control valve 32 is coupled to a servo link 50 that structures a mechanical feedback mechanism. The speed change control valve 32 is driven by a stepping motor 40 that is coupled to one end of the servo link 50, and receives groove width feedback, in other words feedback on the pulley ratio, from the movable conical plate 11a of the primary pulley 11, which is coupled to the other end of the servo link 50. The speed change control valve 32 performs intake and discharge of an oil pressure to and from the primary pulley cylinder chamber 11c in accordance with displacement of a spool 32a. The speed change control valve 32 regulates the primary pressure Ppri such that the pulley ratio becomes a target pulley ratio commanded as a driving position for the stepping motor 40, receives a displacement from the servo link 50 when speed change is complete, and maintains the spool 32a in a closed valve position.

The pressure reducing valve 33 has a solenoid, and is a valve that controls the secondary pressure Psec so as to become a target secondary pressure tPsec to be discussed later.

The line pressure PL that is supplied from the oil pressure pump 34 and is pressure-regulated by the regulator valve 31 is then supplied to the speed change control valve 32 and the pressure reducing valve 33.

The pulley ratio between the primary pulley 11 and the secondary pulley 12 is controlled by the stepping motor 40, which is driven in accordance with a speed change command signal from the CVT controller 20. The spool 32a of the speed change control valve 32 moves in accordance with displacement of the servo link 50 corresponding to the amount that the stepping motor 40 is driven. The line pressure PL supplied to the speed change valve 32 is adjusted to the primary pressure Ppri and supplied to the primary pulley 11. The groove width of the primary pulley 11 is thus changed.

The CVT controller 20 controls the pulley ratio and the contact frictional force with the V-belt 13 by reading in: a select lever position from the inhibitor switch 23; the amount by which the accelerator pedal 22 is depressed from the accelerator pedal depression amount sensor 24; the oil temperature of the V-belt CVT 10 from the oil temperature sensor 25; the pulley rotational speed from the rotational speed sensors 26 and 27; and the oil pressure from an oil pressure sensor 28. The oil pressure sensor 28 is a sensor that detects the secondary pressure Psec supplied to the cylinder chamber 12c of the secondary pulley 12.

The CVT controller 20 is structured by: a speed change controlling portion 201 that determines the target pulley ratio in accordance with the vehicle speed and the amount by which the accelerator pedal is depressed, drives the stepping motor 40, and controls the current pulley ratio so as to become the target pulley ratio; and a pulley pressure controlling portion 202 that controls the primary pressure Ppri and the secondary pressure Psec in accordance with an input torque Tin, the pulley ratio, the oil temperature, a target speed change speed tSsp, and the like, and controls a thrust force Fpri of the primary pulley 11 and a thrust force Fsec of the secondary pulley 12.

The pulley pressure controlling portion 202 determines a target line pressure tPL based on the input torque Tin, the pulley ratio, and the oil temperature, and controls the line pressure PL by driving the solenoid of the regulator valve 31. Further, the pulley pressure control portion 202 determines the target value tPsec of the secondary pressure Psec, and drives the solenoid of the pressure reducing valve 33 in accordance with the value detected by the oil pressure sensor 28 and the target value tPsec, thus performing feedback control of the secondary pressure Psec.

Figure 3:
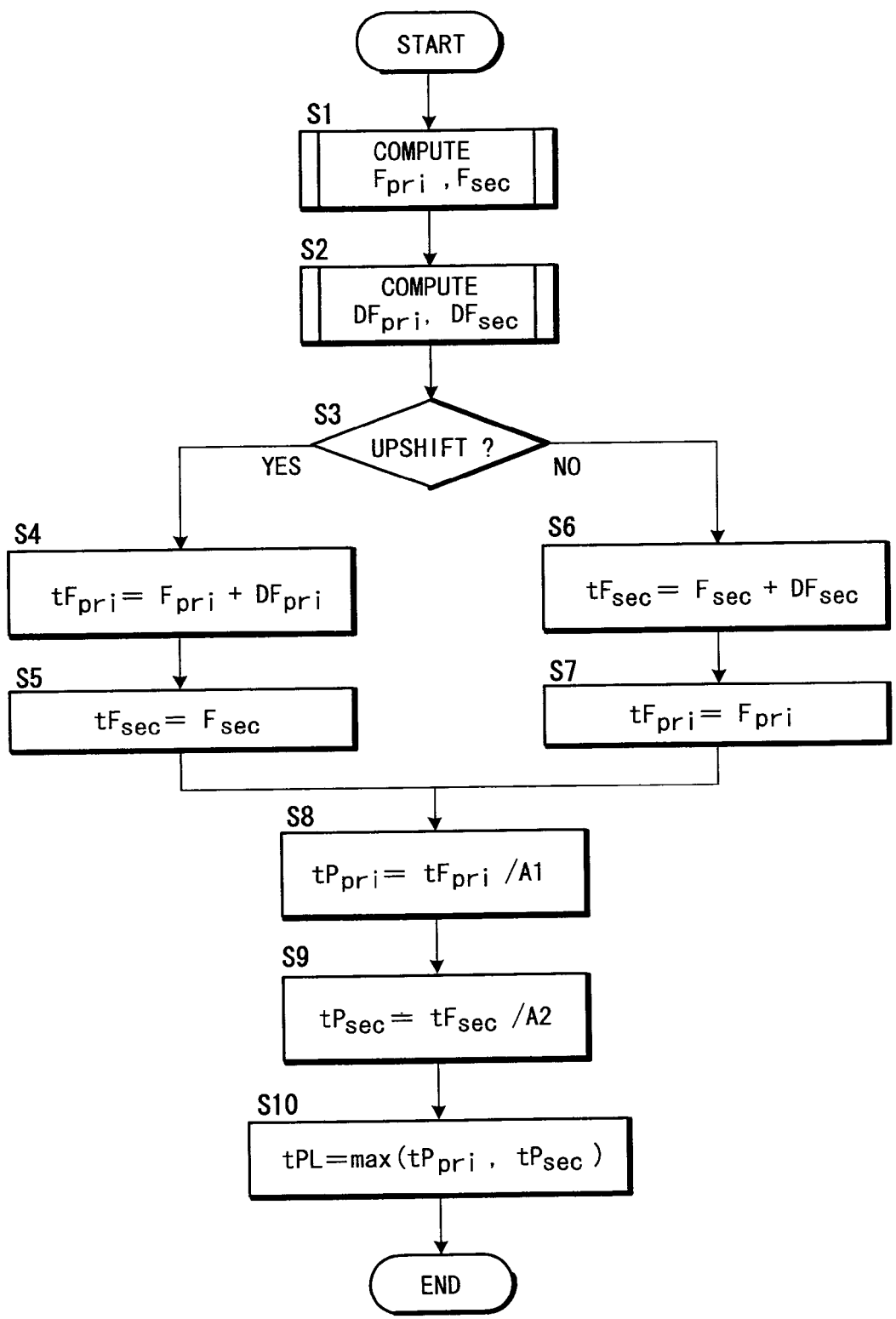
FIG. 3 is a flowchart that shows control contents for the CVT controller.

FIG. 3 is a flowchart that shows the control contents of the CVT controller.

First, the thrust force of the primary pulley 11 (primary thrust force) Fpri and the thrust force of the secondary pulley 12 (secondary thrust force) Fsec necessary for maintaining the current speed ratio are computed in step S1. The thrust forces necessary for maintaining the current speed ratio (pulley ratio maintenance thrust forces) are thrust forces that are needed in order to maintain the current pulley ratio, ensure the V-belt torque capacity, and transmit the current torque without causing the V-belt to slip. A specific computation method is discussed below.

In step S2, a correction amount (primary thrust force correction amount) DFpri for the thrust force of the primary pulley 11 necessary for achieving the target speed change speed tSsp, and a correction amount (secondary thrust force correction amount) DFsec for the thrust force of the secondary pulley 12 necessary for achieving the target speed change speed tSsp are each computed. A specific computation method is discussed below.

A determination is made in step S3 as to whether the speed change is an upshift or a downshift. This determination is made based on the target speed change speed tSsp found in step S2, more specifically found in step S21, which is discussed in more detail later.

Operation proceeds to step S4 if speed change is an upshift. A value equal to the primary thrust force Fpri plus the primary thrust force correction amount DFpri is taken as a target thrust force tFpri for the primary pulley 11. The secondary thrust force Fsec is set as a target thrust force tFsec of the secondary pulley 12 in step S5.

On the other hand, operation proceeds to step S6 if speed change is a downshift. A value equal to the secondary thrust force Fsec plus the secondary thrust force correction amount DFsec is taken as the target thrust force tFsec of the secondary pulley 12. The primary thrust force Fpri is set as the target thrust force tFpri of the primary pulley 11 in step S7.

A value equal to the target thrust force tFpri of the primary pulley 11 divided by the pressure receiving surface area A1 of the primary pulley 11 is taken as the target value tPpri of the primary pressure Ppri in step S8. A value equal to the target thrust force tFsec of the secondary pulley 12 divided by the pressure receiving surface area A2 of the secondary pulley 12 is taken as the target value tPsec of the secondary pressure Psec in step S9.

The larger of the target primary pressure tPpri and the target secondary pressure tPsec is set as the target line pressure tPL in step S10, and the solenoid of the regulator valve 31 is controlled such that the line pressure PL becomes the target line pressure tPL.

Figure 4:
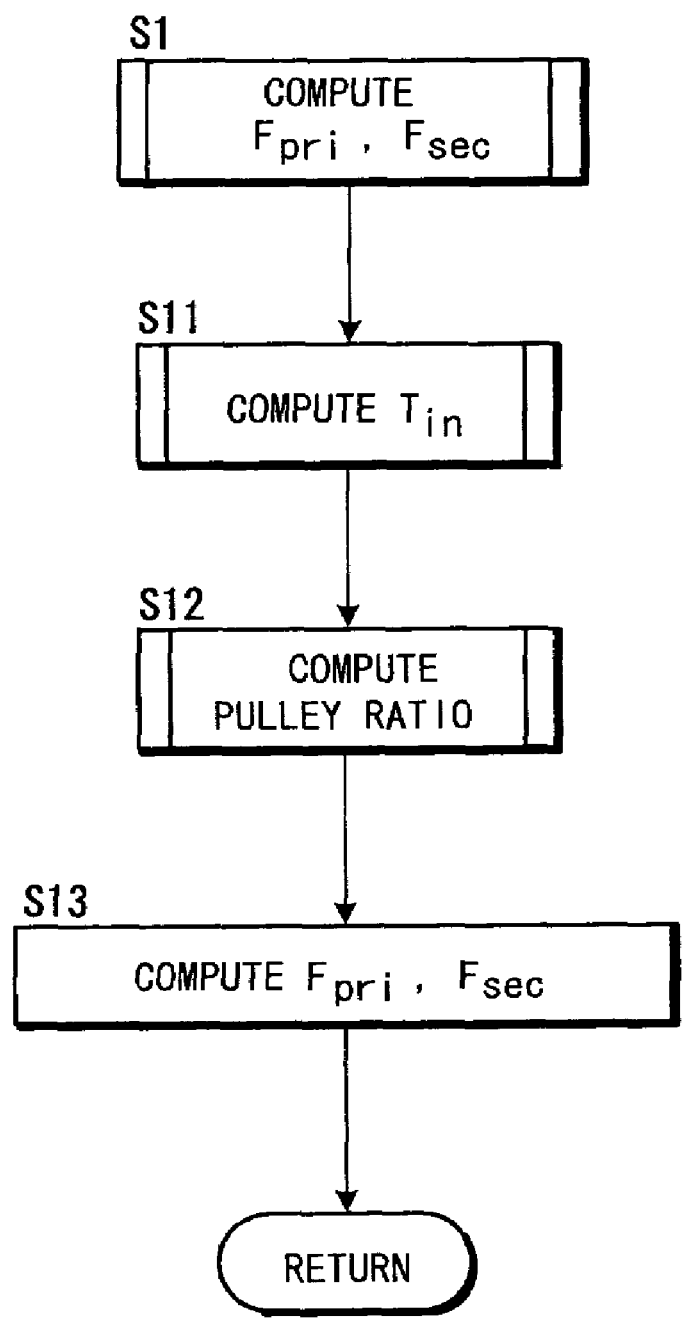
FIG. 4 is a flowchart of a subroutine for computing pulley ratio maintenance thrust forces of a primary pulley and a secondary pulley.
Figure 5A:
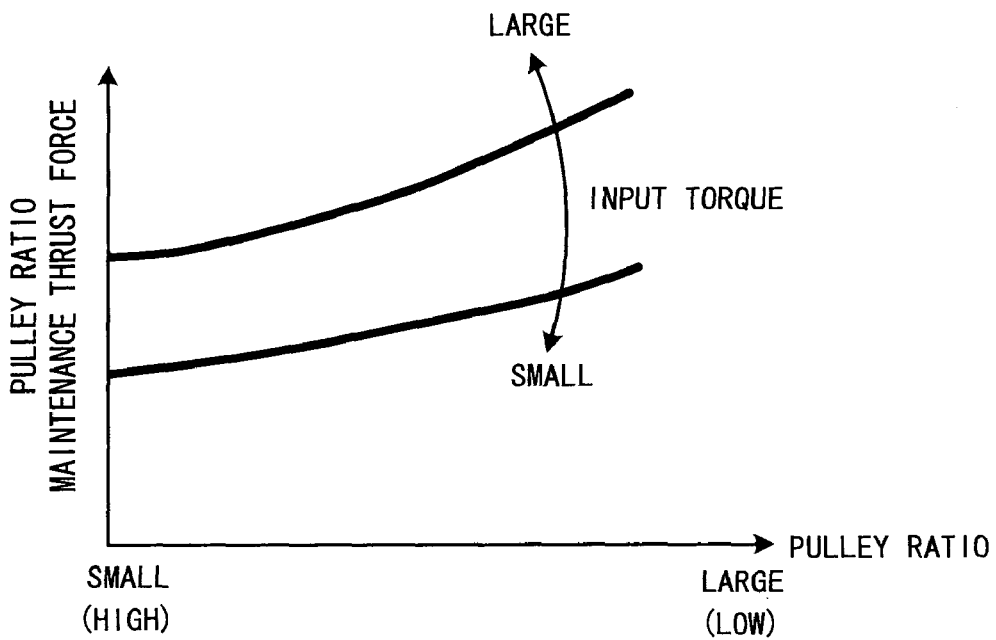
Figure 5B:
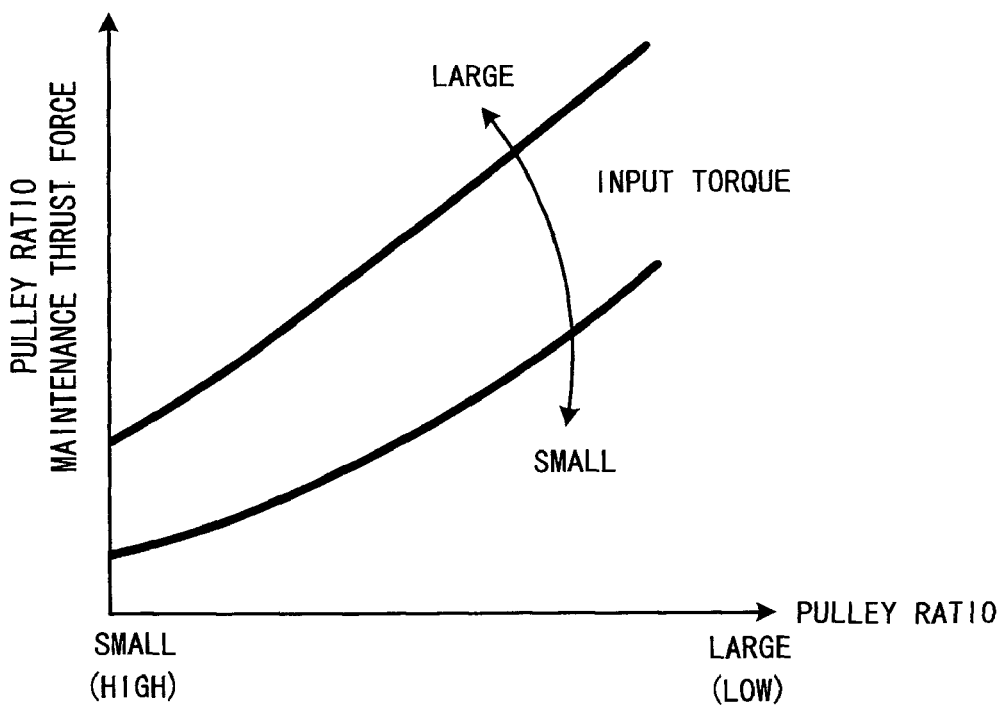

FIG. 4 is a flowchart of a subroutine for computing the pulley ratio maintenance thrust forces of the primary pulley 11 and the secondary pulley 12 (the primary thrust force Fpri and the secondary thrust force Fsec, respectively). FIGS. 5A and 5B are maps that show the relationships between the pulley ratio and the pulley ratio maintenance thrust forces. FIG. 5A is a map for use with the primary pulley 11, and FIG. 5B is a map for use with the secondary pulley 12.

The torque Tin input to the primary pulley 11 is computed in step S11. For example, a value obtained by multiplying the torque of the engine 1 input from the engine controller 21 by a torque ratio of the torque converter 2 is calculated as the input torque Tin.

The current pulley ratio is computed in step S12 based on the rotational speeds of the primary pulley 11 and the secondary pulley 12, which are detected by the rotational speed sensors 26 and 27, respectively.

In step S13, the primary pulley thrust force Fpri is found by referencing the map used for the primary pulley 11 (FIG. 5A), and the secondary pulley thrust force Fsec is found by referencing the map used for the secondary pulley 12 (FIG. 5B).

The pulley ratio is shown on the horizontal axis in the maps of FIGS. 5A and 5B, and the pulley ratio maintenance thrust force is shown on the vertical axis. The pulley ratio becomes larger toward the right side (LOW side) in the figures. A plurality of relationships between the pulley ratio and the pulley ratio maintenance thrust force are prepared for each of the input torques, and the pulley ratio maintenance thrust force becomes larger with larger input torque, even at the same pulley ratio.

Comparing the map used for the primary pulley 11 (FIG. 5A) with the map used for the secondary pulley 12 (FIG. 5B), the primary thrust force Fpri is larger than the secondary thrust force Fsec when the pulley ratio is small, and the secondary thrust force Fsec is larger than the primary thrust force Fpri when the pulley ratio is large. The primary pulley 11 diagram of FIG. 5A therefore has a gentler slope than the secondary pulley 12 diagram of FIG. 5B.

Figure 6:
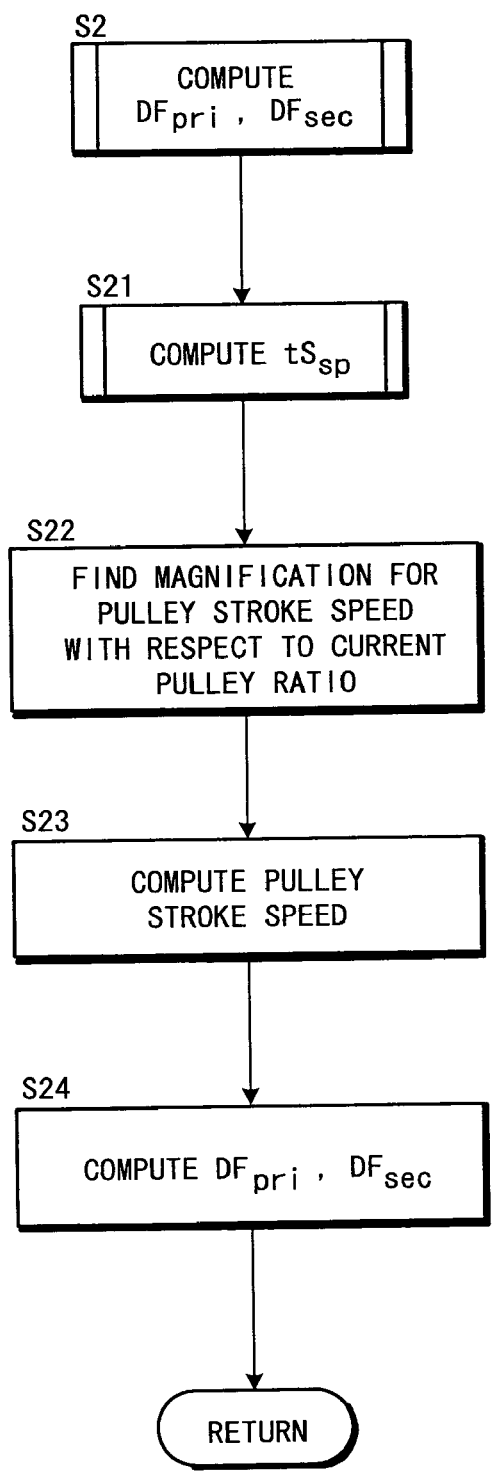
FIG. 6 is a flowchart of a subroutine for computing an amount of correction for a thrust force on a primary pulley and a secondary pulley necessary for attaining a target speed change speed.
Figure 7:
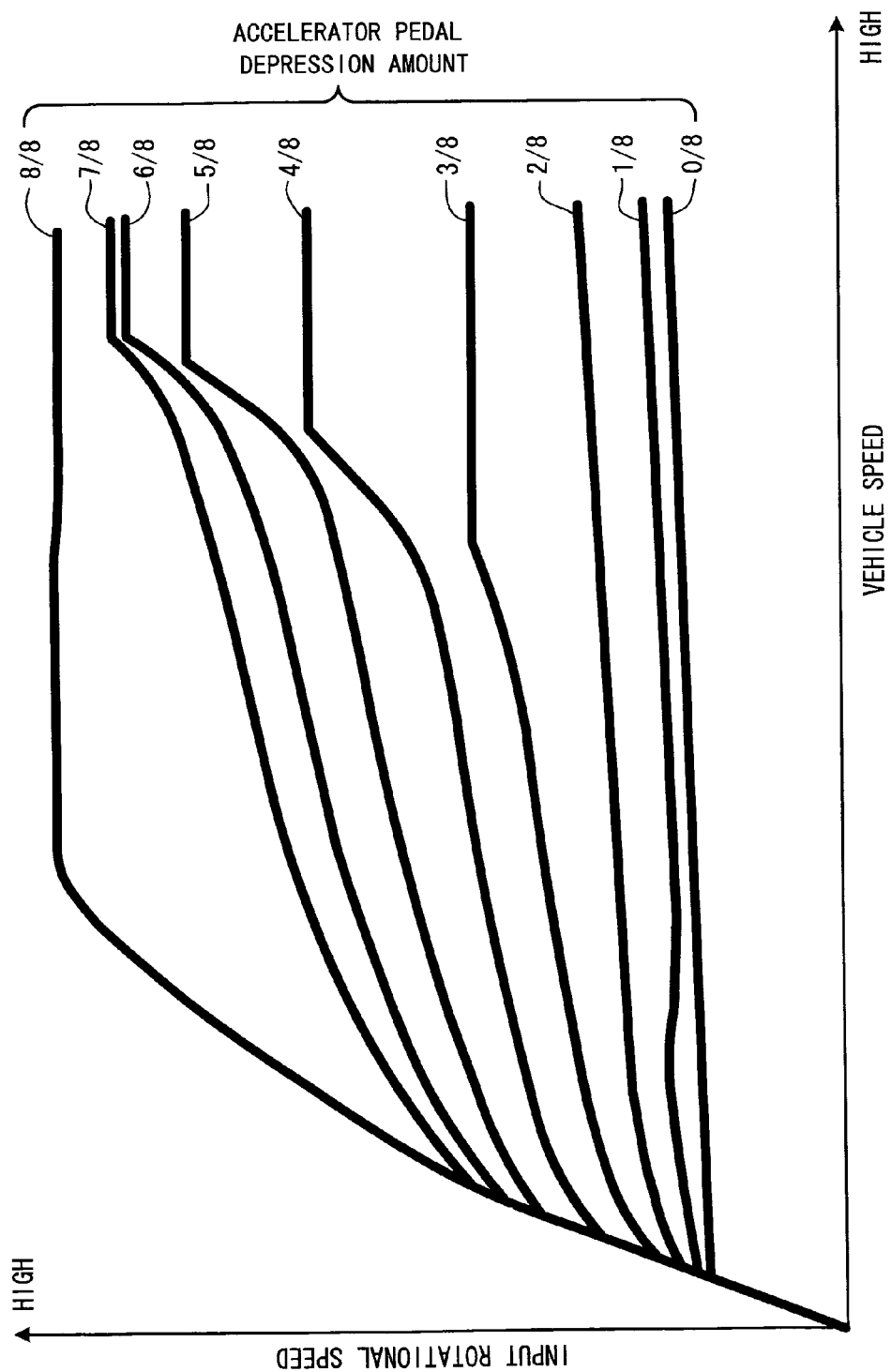
FIG. 7 is a shift pattern map of the V-belt CVT.
Figure 8:
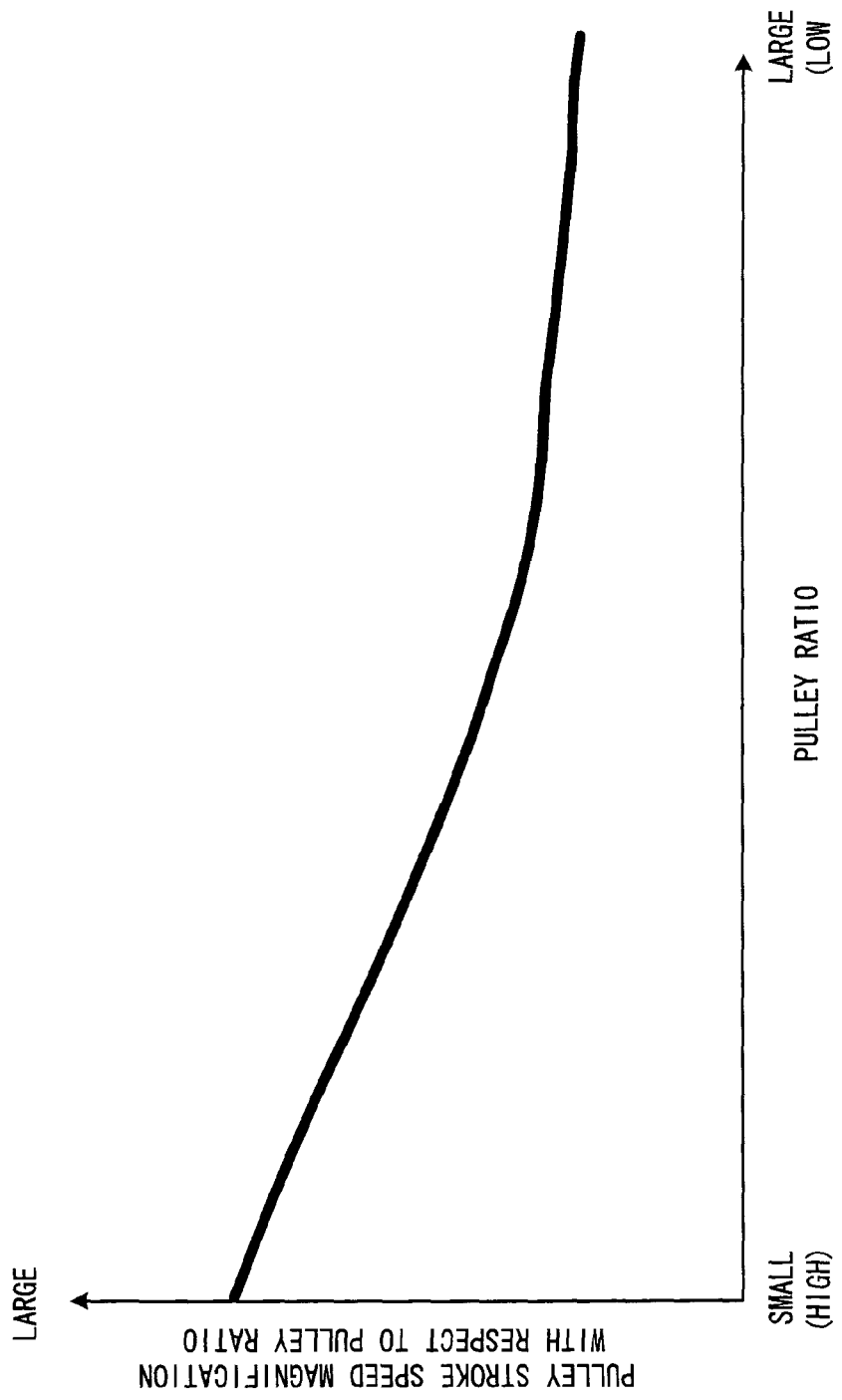
FIG. 8 is a map that shows a relationship between a pulley ratio and a pulley stroke speed magnification.
Figure 9A:
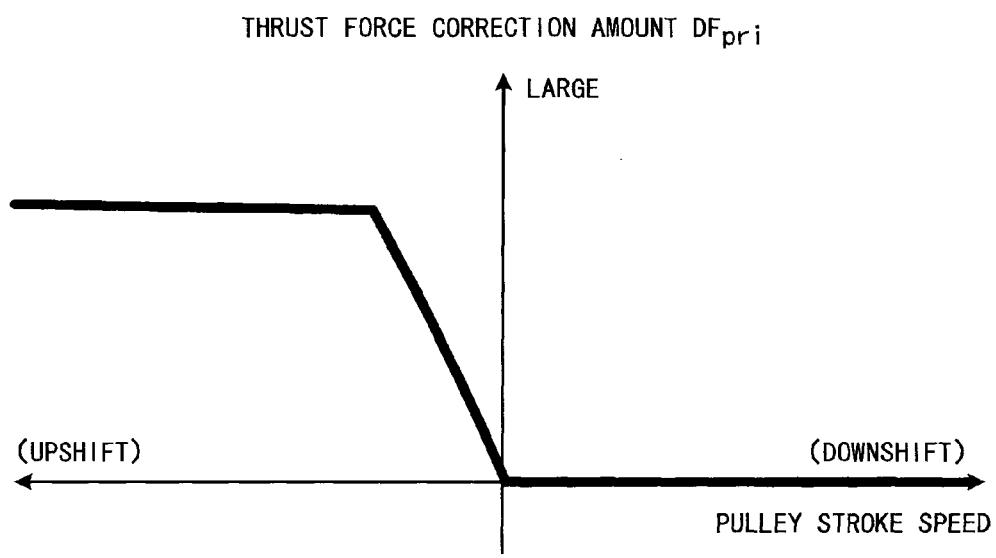
Figure 9B:
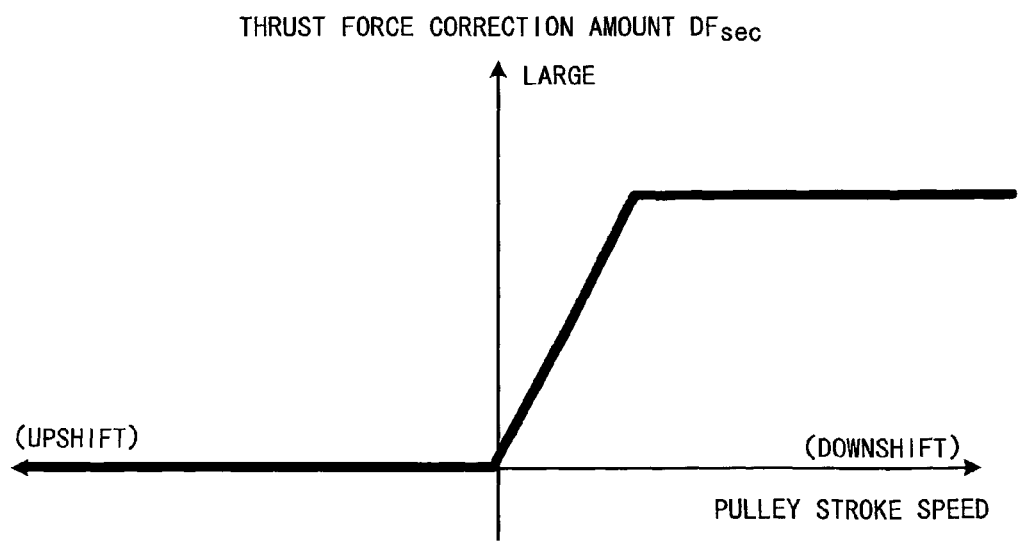

FIG. 6 is a flowchart of a subroutine for computing the correction amounts DFpri and DFsec for the thrust forces of the primary pulley 11 and the secondary pulley 12, respectively, necessary for achieving the target speed change speed. FIG. 7 is a shift pattern map, and FIG. 8 is a magnification map for the pulley stroke speed with respect to the pulley ratio. FIGS. 9A and 9B are maps that show the relationship between the pulley stroke speed and the correction amount for the pulley thrust forces. FIG. 9A is a map for use with the primary pulley 11, and FIG. 9B is a map for use with the secondary pulley 12.

The target speed change speed tSsp is computed in step S21. For example, a ratio of the vehicle speed to an input rotational speed (rotational speed of the primary pulley 11) is found based upon the vehicle speed and the accelerator pedal depression amount by referring to the shift pattern map of FIG. 7. A map-referenced pulley ratio, which is a final target pulley ratio, is then computed based on the above-obtained ratio. In addition, based on a time constant set in accordance with types of speed change, such as upshifts due to increases in the vehicle speed, downshifts due to decreases in the vehicle speed, downshifts due to pressing down on the accelerator pedal 22, and upshifts due to releasing of the accelerator pedal 232, the map-referenced pulley ratio is delayed by the time constant with a first order lag, thereby computing the target pulley ratio. A value obtained by subtracting the target pulley ratio from the map-referenced pulley ratio and dividing it by the time constant is set as the target speed change speed tSsp.

A magnification for the stroke speed of the pulley with respect to the current pulley ratio is found in step S22 by referencing the map shown in FIG. 8. This magnification is multiplied by the target speed change speed tSsp computed in step S21, thus computing a pulley stroke speed in step S23.

The pulley thrust force correction amounts DFpri and DFsec in accordance with the pulley stroke speed are found in step S24 by referencing the map used for the primary pulley 11 (FIG. 9A) and the map used for the secondary pulley 12 (FIG. 9B).

Figure 10:
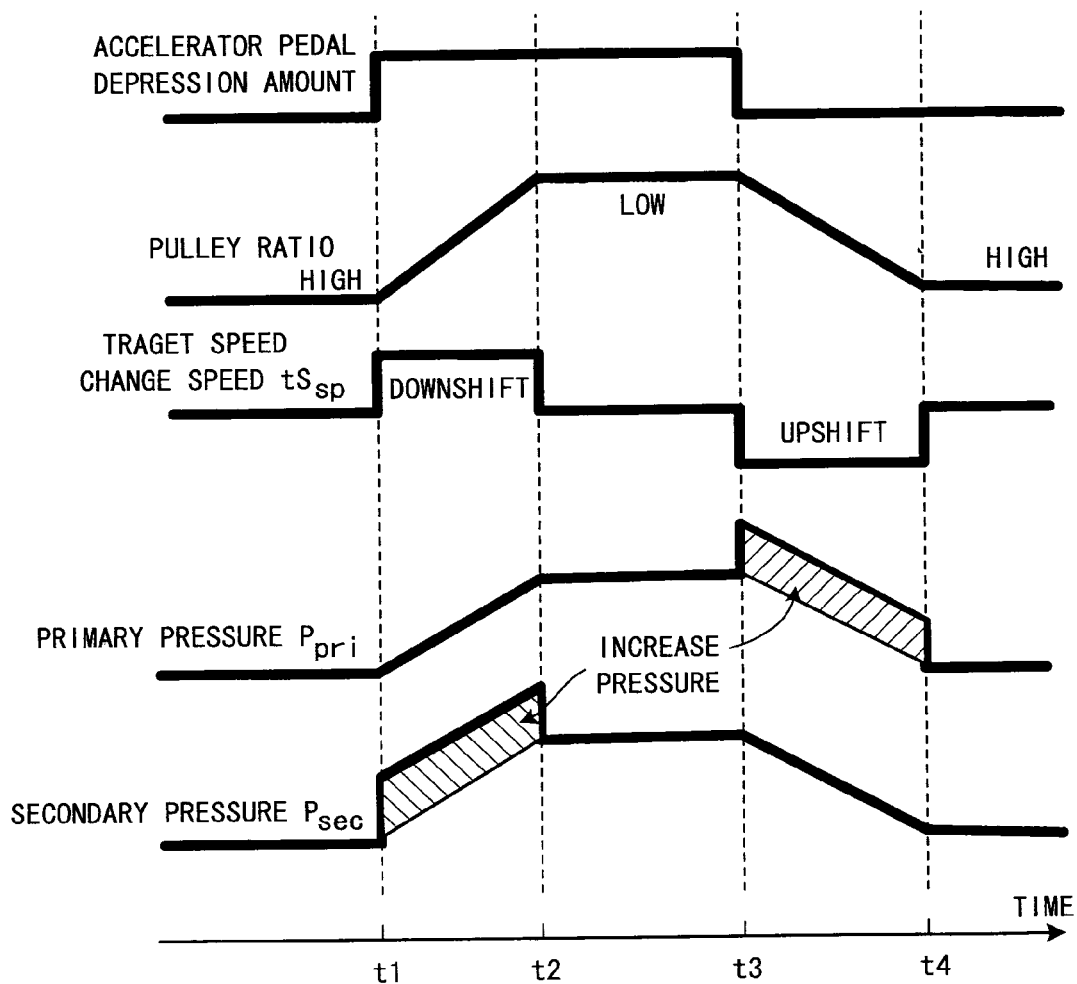
FIG. 10 is a time chart when performing an upshift by suddenly depressing an accelerator pedal, and thereafter suddenly releasing the accelerator pedal, thus performing a downshift.

FIG. 10 is a time chart when performing a downshift by suddenly depressing the accelerator pedal 22 at a time t1, and then performing an upshift by suddenly releasing the accelerator pedal 22 at a time t3.

The pulley ratio is changed from the HIGH side to the LOW side (downshift) when the accelerator pedal 22 is suddenly depressed at the time t1. The correction amount DFsec for the thrust force of the secondary pulley 12 necessary in order to achieve the computed target speed change speed tSsp is added to the secondary thrust force Fsec necessary for maintaining the speed ratio and taken as the target thrust force tFsec of the secondary pulley 12. The secondary pressure Psec of the secondary pulley 12 is thus increased (hatched portion in FIG. 10). The primary pressure Ppri during this period is set at a pressure force corresponding to the Fpri necessary for maintaining the speed ratio.

The input torque increases in accordance with the accelerator pedal 22 being depressed during a period from the time t1 to a time t2, and the pulley ratio continues to increase. The primary pressure Ppri and the secondary pressure Psec, which correspond to the primary thrust force Fpri and the secondary thrust force Fsec, respectively, therefore continue to increase.

Control is performed during the period from the time t1 to the time t2 as follows.

The primary thrust force Fpri and the secondary thrust force Fsec necessary for maintaining the current speed ratio are computed from the torque input to the primary pulley 11 and the current pulley ratio in step S1 of FIG. 3. The target speed change speed tSsp is computed in step S2. The magnification of the stroke speed of the pulley with respect to the pulley ratio is found by referencing the map shown in FIG. 8, and the stroke speed of the pulley is computed by multiplying the magnification and the target speed change speed tSsp. The thrust force correction amounts DFpri and DFsec are then found in accordance with the pulley stroke speeds by referencing FIG. 9A and FIG. 9B.

Operation proceeds to step S6 if it is determined based on the target speed change speed tSsp that speed change is a downshift in the step S3. The correction amount DFsec for the secondary mist force is added to the secondary thrust force Fsec, and this value is set as the target mist force tFsec of the secondary pulley 12. The primary thrust force Fpri is set to the target thrust force tFpri of the primary pulley 11 in step S7. The target primary pressure tPpri and the target secondary pressure tPsec are computed in steps S8 and S9, respectively, by dividing the target primary thrust force tFpri and the target secondary thrust force tFsec by the pulley pressure receiving surface areas A1 and A2, respectively.

Operation proceeds to step S10. The larger of the target primary pressure tPpri and the target secondary pressure tPsec is set as the target line pressure tPL, and the solenoid of the regulator valve 31 is controlled so that the line pressure PL becomes the target line pressure tPL. This process is repeated until the time t2 at which the pulley ratio becomes the map-referenced pulley ratio.

The target speed change speed tSsp becomes zero when the pulley ratio coincides with the map-referenced pulley ratio at the time t2, and the thrust force correction amounts DFpri and DFsec also become zero. The target primary thrust force tFpri and the target secondary thrust force tFsec therefore become equal to the thrust forces Fpri and Fsec, respectively, necessary for maintaining the speed ratio. As a result, the primary pressure Ppri and the secondary pressure Psec become constant because there is no change to the amount that the accelerator pedal 22 is depressed, and there are also no changes in the input torque.

The pulley ratio is made to change from the LOW side to the HIGH side (upshift) at the time t3 to a time t4 when the accelerator pedal is suddenly released at the time t3. The thrust force correction amount DFpri necessary for achieving the target speed change speed tSsp is added to the primary thrust force Fpri, and this is set as the target thrust force tFpri of the primary pulley 11. The primary pressure Ppri is thus increased (hatched portion of FIG. 10). During this period, the secondary pressure Psec becomes a pressure corresponding to the thrust force Fsec necessary for maintaining the speed ratio.

The input torque and pulley ratio continue to decrease in accordance with the accelerator pedal 22 being abruptly released during a period from the time t3 to a time t4. The computed primary pressure Fpri and the secondary pressure Fsec therefore continue to decrease.

Control is performed during the period from the time t3 to the time t4 as follows.

The primary thrust force Fpri and the secondary thrust force Fsec necessary for maintaining the speed ratio are computed from the torque input to the primary pulley 11 and the current pulley ratio in step S1. The target speed change speed tSsp is computed in step S2. The magnification of the stroke speed of the pulley with respect to the pulley ratio is found by referencing the map shown in FIG. 8, and the stroke speed of the pulley is computed by multiplying the magnification and the target speed change speed tSsp. The thrust force correction amounts DFpri and DFsec of the pulley are then computed in accordance with the pulley stroke speeds.

Operation proceeds to step S4 if it is determined based on the target speed change speed tSsp that speed change is an upshift in step S3. The thrust correction amount DFpri is added to the primary thrust force Fpri, and this value is set as the target thrust force tFpri of the primary pulley 11. The secondary thrust force Fsec is set to the target thrust force tFsec of the secondary pulley 12 in step S5. The target primary pressure tPpri and the target secondary pressure tPsec are computed in steps S8 and S9, respectively, by dividing the target primary thrust force tFpri and the target secondary thrust force tFsec by the pulley pressure receiving surface areas A1 and A2, respectively.

In step S10, the larger of the target primary pressure tPpri and the target secondary pressure tPsec is set as the target line pressure tPL, and the solenoid of the regulator valve 31 is controlled so that the line pressure PL becomes the target line pressure tPL. This step is repeated until the time t4 at which the pulley ratio becomes the map-referenced pulley ratio.

In accordance with this embodiment, the pulley maintenance thrust forces (the primary thrust force, Fpri, and the secondary thrust force, Fsec) necessary for ensuring the torque capacity of the V-belt and maintaining the current pulley ratio are computed along with the thrust force correction amounts DFpri, DFsec necessary for achieving the target speed change speed. The thrust force correction amount DFpri is added to the primary thrust force Fpri if there is an upshift (step S4), and the primary pressure is increased. The thrust force correction amount DFsec is added to the secondary thrust force Fsec if there is a downshift (step S6), increasing the secondary pressure. Speed change is performed in a state in which the torque capacity of the pulley is always ensured. The oil pressure of the primary pulley can thus be prevented from being reduced excessively enough to cause the belt slippage.

Further, a speed change flow rate has conventionally been found by converting both the target pulley ratio and the current pulley ratio into pulley stroke positions, and finding a speed change flow rate (pulley stroke speed) corresponding to the deviation between the two. However, the relationship between the pulley stroke amount and the pulley ratio does not change linearly, but instead takes on a non-linear form. It is therefore difficult to control speed change to a desired speed change speed. However, the target speed change speed is computed in this embodiment, and in addition, a gain between the target speed change speed and the pulley stroke speed is set in advance as a pulley ratio function. The target speed change speed is multiplied by the gain, and the thrust force correction amount is computed in accordance with the pulley stroke speed, and therefore information on the target speed change speed, which is used in speed change control, is also utilized in an oil pressure control. Speed change is thus easily controlled by the desired speed change speed.

In addition, the larger of the target primary pressure tPpri and the target secondary pressure tPsec is set as the target line pressure tPL, and the solenoid of the regulator valve 31 is controlled so that the line pressure PL becomes the target line pressure tPL. The primary pressure Ppri and the secondary pressure Psec are therefore guaranteed, and deterioration in fuel efficiency can be avoided without increasing the line pressure PL more than necessary.

The present invention is not limited to the embodiments explained above, and various transformations and changes to the invention are possible within the scope of the technological concepts thereof. It is clear that these transformations and changes are also equivalent to the present invention.

For example, the pulley ratio maintenance thrust forces (the primary thrust force Fpri and the secondary thrust force Fsec) necessary for maintaining the speed ratio, and the thrust force correction amounts (the primary thrust force correction amount DFpri and the secondary thrust force correction amount DFsec) necessary for achieving the target speed change speed are computed. The target primary pressure tPpri and the target secondary pressure tPsec are computed by converting the target primary thrust force tFpri and the target secondary thrust force tFsec, which have been calculated based on the pulley ratio maintenance thrust forces and the thrust force correction amounts, into oil pressures. However, the method used for computing the target primary pressure tPpri and the target secondary pressure tPsec is not limited to this method. The pulley ratio maintenance thrust forces Fpri and Fsec, and the thrust force correction amounts DFpri and DFsec may each be converted into oil pressures, for example, and the target primary pressure tPpri and the target secondary pressure tPsec may be computed based on the oil pressures thus obtained by the conversion.

Speed change control is performed in accordance with the amount that the accelerator pedal is depressed, but it is also possible to perform speed change control by using a throttle opening of the engine 1 as a substitute for the amount of accelerator pedal depression.

The thrust force correction amounts DFpri and DFsec may also be changed in accordance with oil temperature or the like. For example, the thrust force correction amounts DFpri and DFsec may be changed so as to become larger at low temperature when the oil temperature becomes less than a predetermined value, or during high temperature when the oil temperature is greater than a predetermined value.

Further, although a process for determining the target speed change speed tSsp are shown in FIG. 6, the target speed change speed tSsp may also be determined by another process.

This application claims priority from Japanese Patent Application 2002-250462, filed Aug. 29, 2002, which is incorporated herein by reference in its entirety.

What is claimed is:

1. A V-belt continuously variable transmission comprising:
   an input shaft;
   an output shaft;
   a primary pulley that is connected to the input shaft and whose groove width is configured to change in accordance with a supplied fluid pressure;
   a secondary pulley that is connected to the output shaft and whose groove width is configured to change in accordance with a supplied fluid pressure;
   a V-belt that is wrapped around the primary pulley and the secondary pulley; and
   a controller that is configured to:
      compute a pulley ratio maintenance thrust force, which is a thrust force necessary for maintaining a speed ratio, for each of the pulleys;
      compute a thrust force correction amount for achieving a target speed change speed; and
      when the speed ratio is to be increased:
         set the fluid pressure supplied to the primary pulley to a fluid pressure necessary for ensuring a torque capacity of the V-belt and necessary for maintaining the speed ratio;
         set the fluid pressure supplied to the secondary pulley to a fluid pressure that is higher than the fluid pressure necessary for ensuring the torque capacity of the V-belt and necessary for maintaining the speed ratio, thereby attaining the target speed change speed;
         supply a fluid pressure to the primary pulley corresponding to the pulley ratio maintenance thrust force; and
         supply a fluid pressure to the secondary pulley corresponding to the sum of the pulley ratio maintenance thrust force and the thrust force correction amount.

2. A V-belt continuously variable transmission according to claim 1, wherein the controller is further configured to:
   convert the target speed change speed into a pulley stroke speed; and
   compute the thrust force correction amount from the pulley stroke speed and the pulley ratio.

* * * * *